United States Patent [19]
Kaku

[11] Patent Number: 5,124,982
[45] Date of Patent: Jun. 23, 1992

[54] MULTIPLE PORT MEDIUM ATTACHMENT UNIT FOR A NETWORK

[75] Inventor: Shinkyo Kaku, San Jose, Calif.

[73] Assignee: Allied Telesis, Incorporated, Mountain View, Calif.

[21] Appl. No.: 486,086

[22] Filed: Feb. 27, 1990

[51] Int. Cl.⁵ .............................................. H04J 3/02
[52] U.S. Cl. .................................. 370/85.3; 340/825.5
[58] Field of Search .......................... 370/85.3, 85.13; 375/36; 340/825.5; 455/58

[56] References Cited

U.S. PATENT DOCUMENTS

| | | | |
|---|---|---|---|
| 4,380,088 | 4/1983 | Lipcon | 340/825.5 |
| 4,775,864 | 10/1988 | Herman | 340/825.5 |
| 4,935,926 | 6/1990 | Herman | 370/85.13 |
| 4,959,829 | 9/1990 | Griesing | 370/85.3 |
| 4,974,190 | 11/1990 | Curtis | 340/825.5 |
| 4,984,248 | 1/1991 | Hong | 340/825.5 |

OTHER PUBLICATIONS

Tanenbaum, Andrew S., "Computer Networks, Second Edition"; 1988; pp. 141-148.
Valor Electronics, Inc., "Coupling Transformers, Interface Modules and DC/DC Converters to Fit Standard Networking Applications", Addendum.
Motorola, "MC 10116, MECL 10K Series, Triple Line Receiver", pp. 3-32 and 1-7.

Primary Examiner—Douglas W. Olms
Assistant Examiner—Dang Ton
Attorney, Agent, or Firm—David E. Lovejoy

[57] ABSTRACT

An apparatus for coupling signals between a CSMA/CD data transmission medium and a plurality of data terminals. Collisions between data signals transmitted from more than one of the data terminals are detected to generate an internal collision signal. An external collision signal is generated in response to detected collision signals on the transmission medium. The internal and external collision signals are merged and broadcast through an isolating transformer to each of the data terminals.

15 Claims, 7 Drawing Sheets

FIG.—4

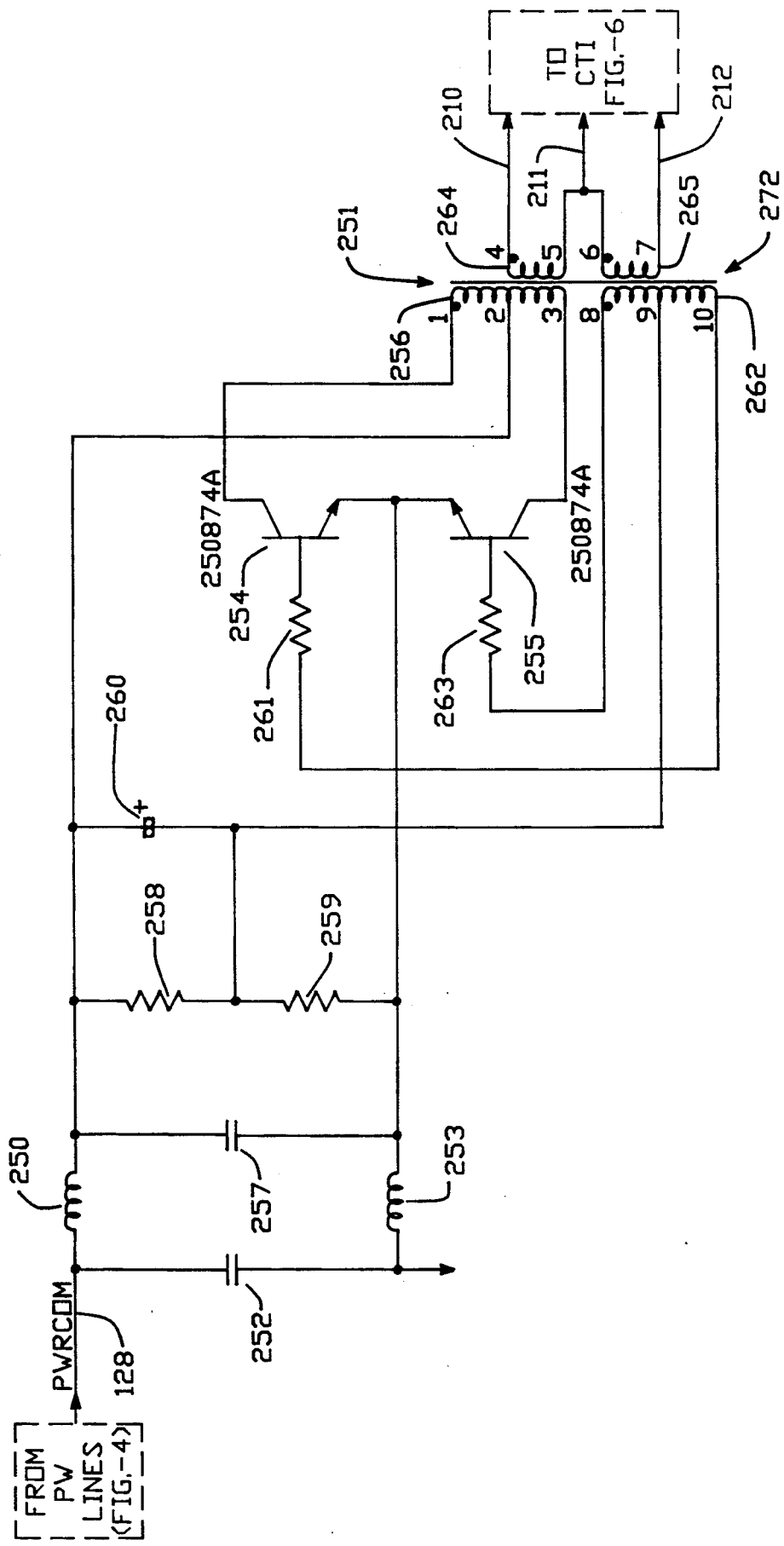
FIG.—7

MULTIPLE PORT MEDIUM ATTACHMENT UNIT FOR A NETWORK

BACKGROUND OF THE INVENTION

1. Field of the Invention

The present invention relates to transceiver circuits for attaching data terminal equipment to a transmission medium; and more particularly to transceivers for attaching a plurality of data terminal equipment at a single location to the transmission cable of the local area network.

2. Description of Related Art

Local area networks are systems for attaching a plurality of data terminal equipment to a transmission medium so that the terminal equipment can communicate amongst each other. Several standard local area networks have evolved, of which a very popular standard is known as Ethernet, or IEEE standard 802.3. Standard 802.3 is a 1-persistent carrier sense multiple access media with collision detection (CSMA/CD). In these systems, when a station wants to transmit, it senses the cable. If the cable is busy, the station waits until the cable goes idle, otherwise it transmits immediately. If two or more stations simultaneously begin transmitting on an idle cable, then a collision occurs. All colliding stations then terminate their transmission, wait a random time and repeat the whole process over again.

Standard 802.3 involves typically a 10 megabit per second base band system using 50 ohm coaxial cable. In order to attach to the cable, a transceiver, or medium attachment unit, is used. The transceiver is clamped onto the cable so that its tap makes contact with the inner core of the cable. The transceiver contains electronics that handle carrier detection and collision detection. When a collision is detected, the transceiver puts a special collision signal on the cable to insure that all other transceivers are notified of the collision.

In order to reduce the number of transceivers needed along a cable, some transceivers allow a plurality of data terminal equipment to attach to them. A typical multi-port transceiver circuit in the prior art is illustrated in FIG. 1. As can be seen, the transceiver includes a first port 10 and a second port 11 which are attached by transceiver cables to a data terminal equipment. These ports are also known as attachment unit interfaces (AUI). The first port is coupled through an isolation transformer 12 to electronic signal coupling and collision detector circuit 13. Similarly, the second port 11 is connected through isolation transformer 14 to the electronic signal coupling and collision detector circuit 13. The electronic signal coupling and collision detector circuit 13 is connected to a third isolation transformer 15 which is attached to a cable transceiver interface (CTI) circuit 16.

Interface circuit 16 is typically an integrated circuit, such as the National Semiconductor DP8392A or an equivalent. This transceiver interface chip is adapted to be connected between the coaxial cable and the port for the data terminal equipment on a single port transceiver unit. For a multiple port unit, a separate signal coupling and collision detector circuit 13 is required to detect collisions between the signals transmitted from the first port 10 or the second port 11.

Power is also typically supplied from the data terminal equipment through the ports 10 and 11. However, a power source is schematically illustrated at point 18 in the circuit in FIG. 1. This point is supplied through a DC/DC converter circuit 19 to power the transceiver interface circuit 16.

As can be seen, in order to connect a plurality of ports at a single transceiver in this system, three separate signal isolation transformer interfaces are required, in addition to the power isolation transformer. Each of these signal isolation transformer interfaces requires a path for transmitted signals, received signals and collision signals. Therefore, the multi-port medium attachment unit is quite expensive.

It is desirable to reduce the number of transformers required for coupling a plurality of data terminal equipment through a single transceiver interface, and otherwise simplify the circuit required for this function.

SUMMARY OF THE INVENTION

The present invention provides an apparatus for coupling signals between a data transmission medium, such as a CSMA/CD medium, and a plurality of data terminals. The apparatus includes a plurality of interface units including transceiver cables for connecting to respective data terminals. An electronic circuit is connected to each of the interface units, for detecting collisions between data signals transmitted from the data terminals through the plurality of interface units, and for generating an internal collision signal in response to a detected collision.

A signal isolating transformer for transmitted signals includes a plurality of the first windings each connected to a respective interface unit and a second winding for supplying a transmitted signal from any of the units as output. A collision signal transformer includes a winding for receiving the internal collision signal from the collision detection circuit or an external collision from a medium transceiver interface circuit, and a plurality of second windings each connected to a respective one of the plurality of interface units.

The medium transceiver interface is coupled to the transmission medium, to the output of the transmit signal transformer and to the input of the collision signal transformer, and includes a circuit for connecting transmitted data from the output of the transmit signal transformer to the transmission medium, a circuit for detecting collisions between data transmitted on the transmission medium and transmitted data from the output of the transmit signal transformer, and a circuit for generating the external collision signal in response to detected collisions.

Further, the apparatus includes a receive signal transformer having an input winding connected to the medium transceiver interface and a plurality of output windings each connected to a respective one of the plurality of interface units, for coupling data received through the medium interface to the plurality of interface units.

According to one aspect of the invention, the collision signal transformer includes a single input winding to which the external collision signal and internal collision signal are supplied through a wired-OR circuit. Alternatively, the collision signal transformer includes a first input winding receiving external collision signal and a second input winding receiving the internal collision signal.

According to another aspect of present invention, the transmission medium comprises a CSMA/CD medium, such as used in Ethernet local area networks.

As can be seen, the present invention employs the attachment unit interface signal coupling transformers to compound the received signals and collision signals, and to merge the transmitted signals, magnetically to accomplish both signal coupling and isolating functions for multiple ports, while reducing significantly the number of components required and improving reliability and manufacturing cost.

BRIEF DESCRIPTION OF THE FIGURES

FIGS. 4–7 provide a detail circuit diagram of a preferred embodiment of the present invention.

DETAILED DESCRIPTION

With reference to FIGS. 2–7, a detailed description of the present invention is provided.

Figure 1:
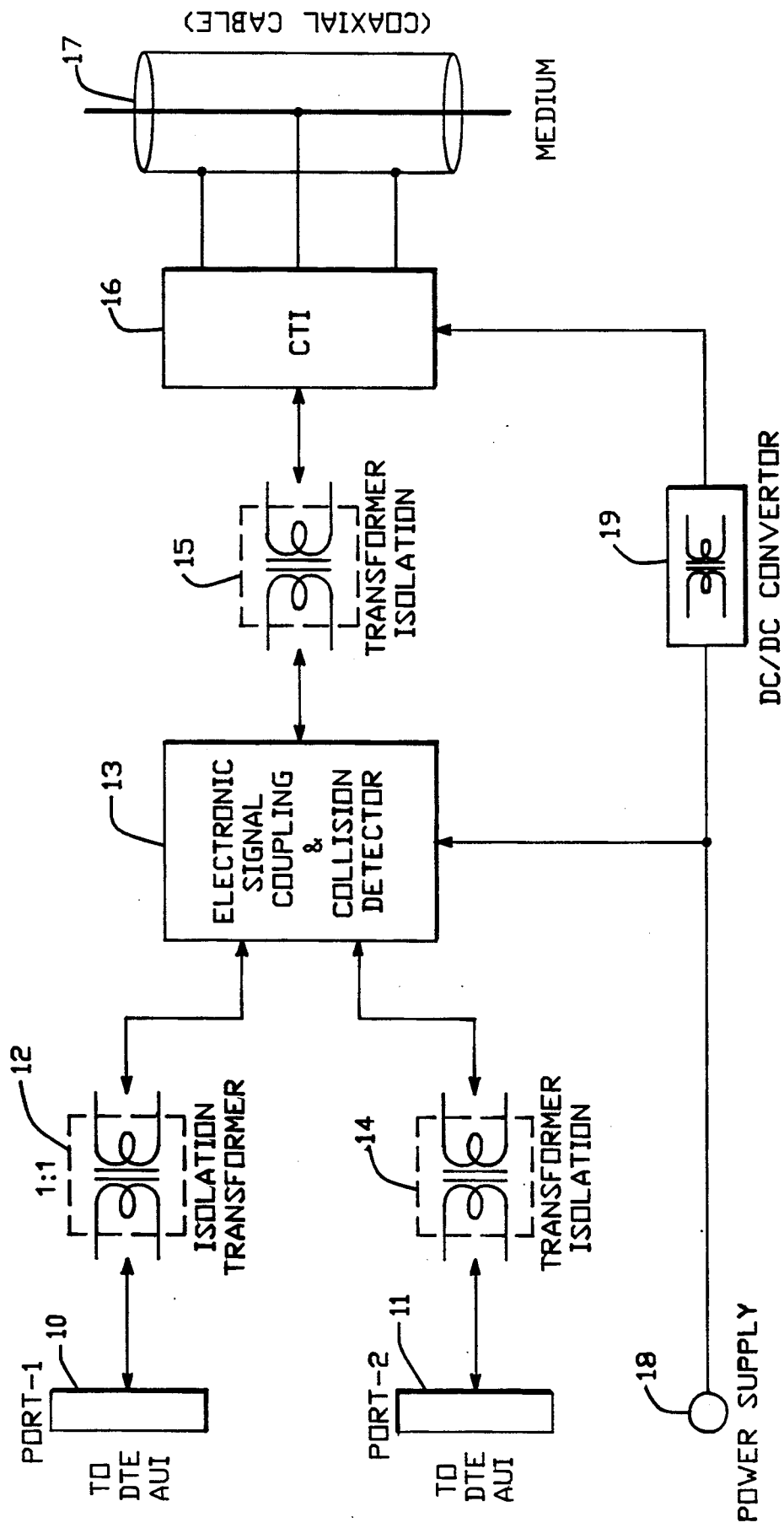
FIG. 1 is a simplified diagram of a prior art multiple port transceiver circuit.
Figure 2:
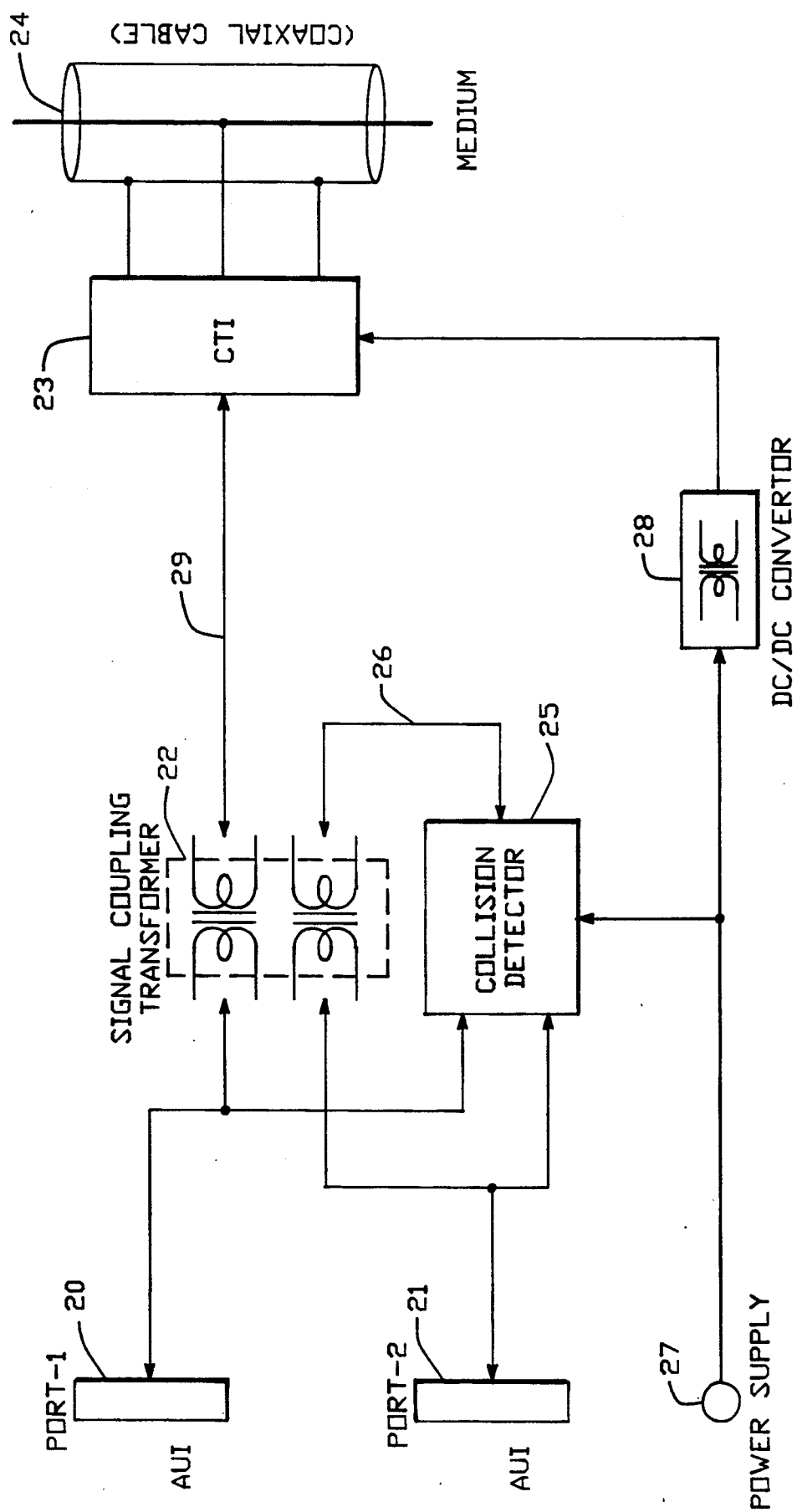
FIG. 2 is a simplified diagram of a multiple port transceiver circuit according to the present invention.

As can be seen in FIG. 2, the transceiver according to the present invention includes first port 20 and a second port 21. The first and second ports are connected through signal coupling transformer 22 to a cable transceiver interface chip 23. The cable transceiver interface (CTI) chip 23 is connected to the coaxial cable 24.

Port 20 and port 21 are also each connected to collision detector circuit 25. The collision detector circuit 25 generates, in response to detected collisions, an internal collision signal on line 26 which is connected to the signal coupling transformer 22.

Line 29 is connected between the signal coupling transformer 22 and the CTI chip 23. Line 29 transmits data from the signal coupling transformer 22 to the CTI chip 23, supplies received data from the CTI chip to the signal coupling transformer 22 and connects an external collision signal from the CTI chip 23 to the signal coupling transformer 22.

The system also includes a power supply which is connected from line 27 through a DC/DC converter 28 to the CTI chip 23.

The CTI chip 23 has the following functional capabilities for handling message flow between data terminal equipment through the interface units 20, 21 and the base band transmission medium:

1. Transmit function. Transmits data received from the signal coupling transformer to the transmission medium and through the transmission medium to one or more remote data terminals in the network.

2. Receive function. Receives serial data streams from the transmission medium and supplies them to the signal coupling transformer 22.

3. Collision detection. Detects the presence of concurrent transmission from the signal coupling transformer 22 and a remote data terminal equipment transmitting across the medium 24, and generates the external collision signal for supply back to the signal coupling transformer 22.

4. Monitor function (optional). It disables the normal transmit data stream to the transmission medium while the normal receive function and collision detection function remain operational.

5. Jabber function. Interrupts the transmit function to inhibit abnormally long output data streams.

Each of these functions are provided in integrated circuits, such as the National Semiconductor DP8392A, and equivalents.

The signal coupling transformer 22, in addition to its isolation function, merges the transmitted data from the ports 20 and 21 into line 29, and compounds the received data and collision signals from lines 29 and 26 to the ports 20 and 21.

Figure 3:
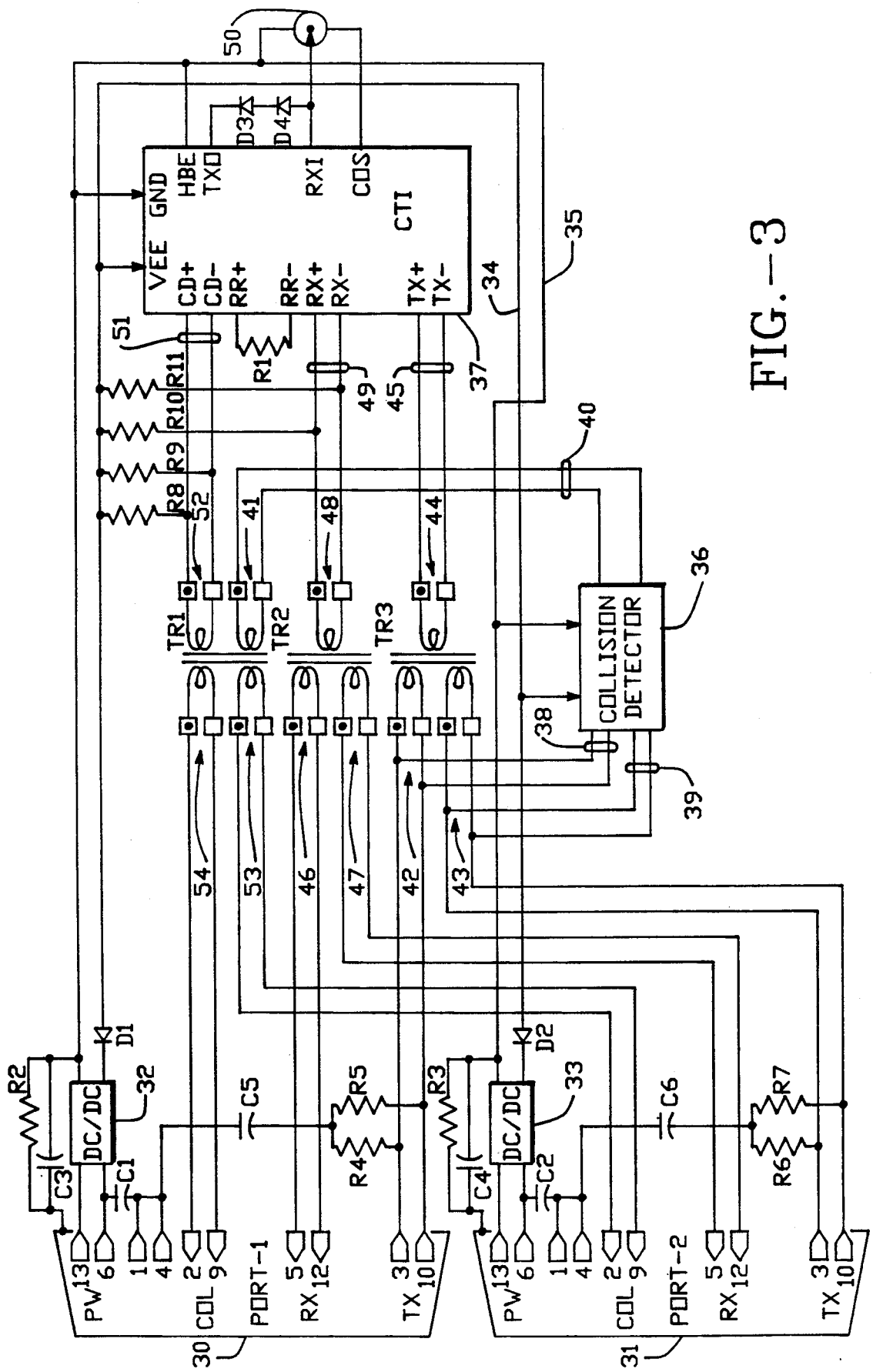
FIG. 3 is a more detailed diagram of a transceiver circuit according to the present invention.

FIG. 3 provides a more detailed diagram of the transceiver unit according to the present invention. The first port 30 and the second port 31 each include connectors for twisted pairs of the transceiver cable required for the IEEE 802.3 standard. A first twisted pair (lines 13, 6) provides power from the data terminal equipment to drive the transceiver circuit. A shield pair (lines 1, 4) connects the shields on the cable to the transceiver circuit A collision pair (lines 2, 9) transmits collision signals from the transceiver circuit to the data terminal equipment. A receive pair (lines 5, 12) connects received data from the transceiver circuit to the data terminal equipment. A transmit pair (lines 3, 10) transmits data from the data terminal equipment through the transceiver circuit to the medium.

The lines 1, 4 of shield pair of the first port 30 are connected through capacitor C1 to line 6 of the power pair 13, 6, and connected to capacitor C5 and resistors R4 and R5 to lines 3 and 10 of the transmit pair. Likewise, the lines 1, 4 of shield pair of the second port 31 are connected through capacitor C2 to the lines 6 of power pair and through capacitor C6 and resistors R6 and R7 to the transmit pair 3, 10 in the second port 31.

The power pair in each circuit is coupled to a respective DC/DC converter 32, 33 to supply power for the transceiver circuit on lines 34 and 35. Reverse diodes D1 and D2 on line 34 are used to protect the converters.

The power on lines 34 and 35 are connected to the collision detector circuit 36 and to the CTI chip 37.

The collision detector 36 receives as input, data from the first port transmit pair on lines 38 and data from the second port transmit pair on lines 39. If a collision is detected, an internal collision signal is supplied on line 40 to winding 41 of first transformer TR1.

The transmit signals on lines 38 and 39 are also connected respectively to winding 42 and winding 43 of transformer TR3. Signals on windings 42 and 43 are coupled to output winding 44 of transformer TR3, which supplies signals transmitted from either of the ports 30, 31 on lines 45 to the transmit pair inputs (TX+, TX−) on the CTI chip 37.

Similarly, the receive pairs (5, 12) for each of the ports 30, 31 are connected to windings 46 and 47 respectively of transformer TR2. An input winding 48 receives signals from the receive outputs (RX+, RX−) of the CTI chip across lines 49.

The CTI chip 37 detects collisions between signals received on the RXI input from the coaxial cable 50 and signals supplied on line 45 to the transmit inputs to the CTI chip 37. The collision signal, termed an external collision signal, is supplied on lines 51 to winding 52 of the transformer TR1. Transformer TR1 includes output windings 53 and 54 which are each connected to a respective one of the collision pairs on port 30 or port 31.

The lines 51 from the collision signal outputs (CD+, CD−) of CTI chip 37 and the lines 49 from the CTI chip 37 each include pull-up resistors R8 through R11 coupled to the power line 34.

The CTI chip includes the transmit output line TXO connected through diode D3 and D4 to the core of the coaxial cable 50. Also, the RXI input line is connected to the core of the coaxial cable 50. The shield of the coax is connected to the COS input of the CTI chip 37 and to line 35.

The windings on the transformers TR1, TR2 and TR3 are set up in ratios so that signals are merged or compounded across the transformer without significant loss in signal level. Thus, the ratio of turns on input winding to output winding is theoretically $1:\sqrt{2}$ for a two port system but is adjusted to offset losses in the particular type of transformer selected. Using ferrite ring core transformers common in these kinds of applications, the ratio in one embodiment was adjusted by trial and error to about 1:1.5.

FIGS. 4–7 set out a detailed circuit diagram of a preferred embodiment of the present invention. In the circuit diagrams, component values have been left off in many places to conserve space. With the information on these circuit diagram identifying certain components by part number, the values of resistance and capacitance of other elements in the circuit can be determined using standard design techniques.

Figure 4:
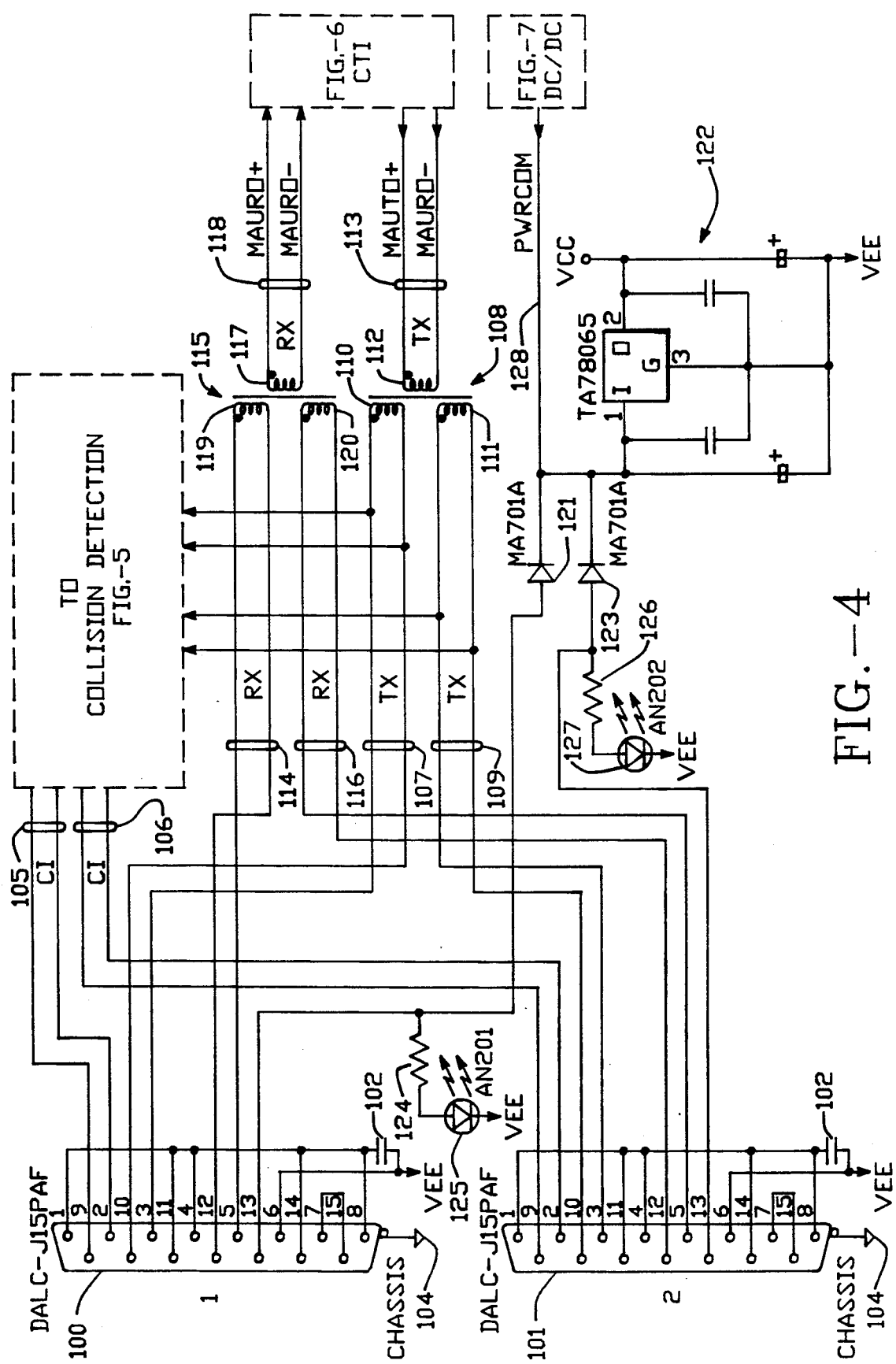

As seen in FIG. 4, the medium attachment unit with the plurality of ports according to the present invention includes a first connector 100 and a second connector 101 for attachment to a transceiver cable according to the IEEE 802.3 standard. Pins 9 and 2 comprise the collision pair. Pins 10 and 3 comprise the transmit pair. Pins 5 and 12 comprise the receive pair. Pins 6 and 13 are the power pair. Pins 7 and 15 are optional control pairs which are unconnected in this embodiment. Pins 1, 11, 4 and 14 are shield lines which are connected through capacitor 102 to the VEE terminal of the circuit. The connectors 100 and 101 are also connected to chassis ground 104.

Figure 5:
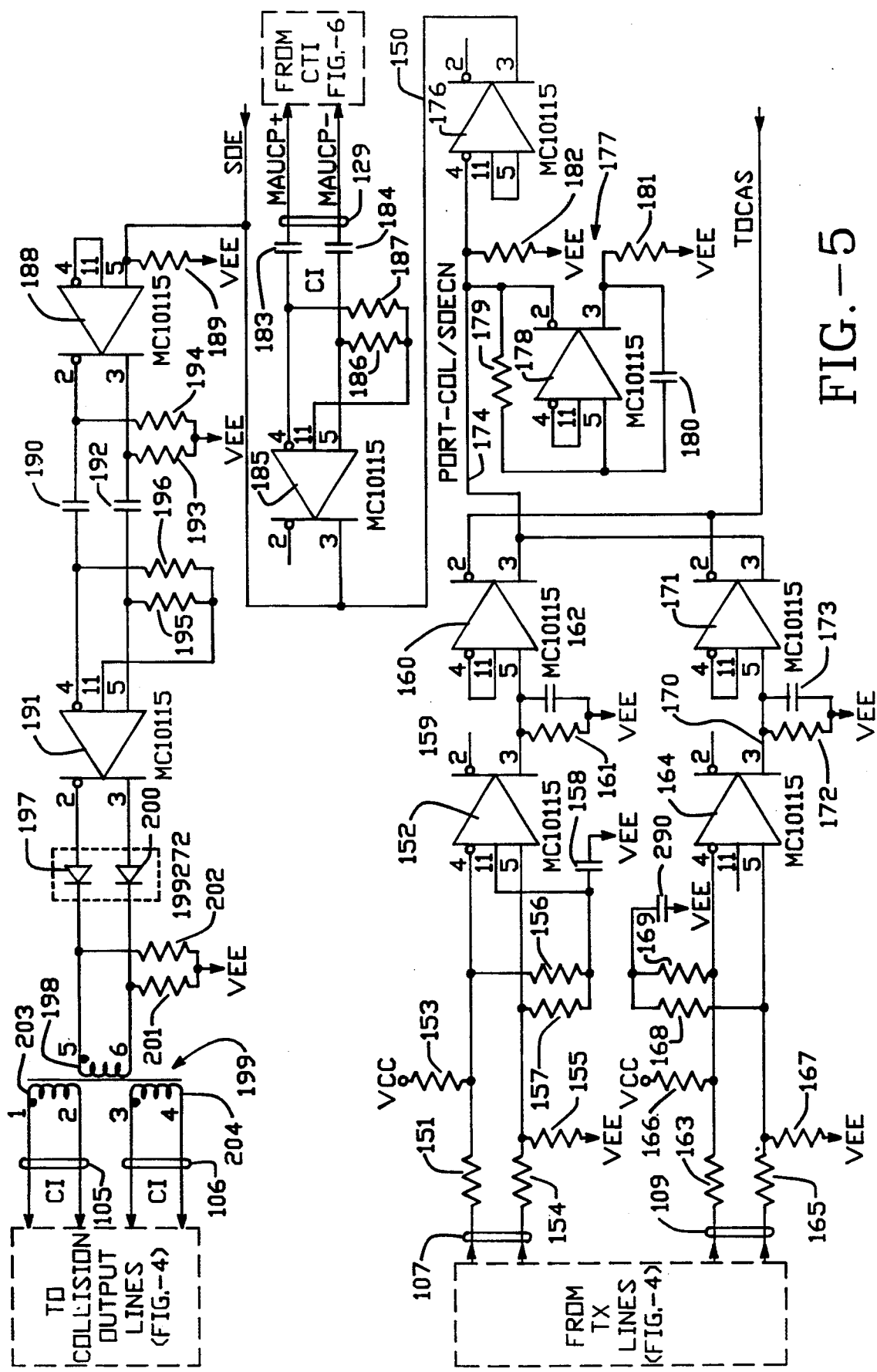

The collision pair from connector 100 is transmitted on lines 105 to the collision detection circuit which is illustrated in FIG. 5. Similarly, the collision pair from the second connector 101 is transmitted on lines 106 to the collision detection circuit of FIG. 5.

The transmit pair from the first connector 100 is transmitted on lines 107 to a transmit signal isolation transformer 108. Similarly, the transmit pair from the second connector 101 is transmitted on lines 109 to the transformer 108. Transformer 108 includes an input winding 110 connected to lines 107 and an input winding 111 connected to lines 109. Output winding 112 of transformer 108 is connected to supply a merged transmit pair on lines 113 to the medium transceiver interface circuit illustrated in FIG. 6.

The receive pair from the first connector 100 is connected on lines 114 to output winding 119 of signal isolation transformer 115. Similarly, the receive pair from the second connector 101 is connected on lines 116 to output winding 120 of signal isolation transformer 115. The signal isolation transformer 115 includes an input winding 117 which receives a receive pair across lines 118 from the transceiver interface circuit of FIG. 6.

The power pairs from the connectors 100 and 101 are used to supply power for the transceiver circuit. The voltage common line (pin 6) for each connectors coupled to the VEE terminal. The voltage plus line (pin 13) for each connector provides 9 volts through a respective diode 121, 123 to voltage regulator circuit 122. Also, the voltage plus pin of the first connector 100 is connected through resistor 124 to light emitting diode 125 to provide an indication that the circuit is powered.

Similarly, the voltage plus line from the second connector 101 is connected through resistor 126 to light emitting diode 127.

The voltage regulator circuit 122 provides a plus 15 volt VCC and 0 volt VEE terminal used by the collision detection circuitry and elsewhere in the transceiver.

A PWRCOM terminal 128 is connected to the input of the voltage regulator circuit 122. This terminal is connected to the DC/DC power convertor and isolator shown in FIG. 7.

FIG. 5 illustrates the collision detection circuitry and the collision signal isolation transformer in the transceiver circuit. Inputs include the transmit lines 107 and 109 from FIG. 4 and the collision pair lines 129 from the CTI circuit of FIG. 6. Outputs include the collision pair lines 105 and 106 which are supplied to the connectors 100 and 101 respectively in FIG. 4.

The collision detection circuitry receives lines 107 and 109 and generates an internal collision signal on line 150 in response to detected collisions.

The positive line of the transmit line pair 107 is connected through resistor 151 to inverting input of gate 152. Also, it is connected through resistor 153 to VCC. The negative line of the transmit pair 107 is connected through resistor 154 to non-inverting input of gate 152. Also, it is connected through resistor 155 to VEE. The reference input of gate 152 is connected through resistor 156 to the inverting input terminal of gate 152 and through resistor 157 to the non-inverting input of gate 152. Also, it is connected through capacitor 158 to VEE. Gate 152 behaves as a Schmitt trigger, producing a single line square wave output in response to a two wire sine wave input.

The non-inverted output of gate 152 is connected on line 159 to the non-inverting input of gate 160. The reference terminal and inverting input of gate 160 are connected together. Line 159 is also connected through resistor 161 and integrating capacitor 162 in parallel to terminal VEE. Gate 160 thus drives its non-inverted output high when a signal is transmitted from connector 100.

Similarly, the positive line of the transmit pair 109 is connected through resistor 163 to the inverting input of gate 164. The negative line of transmit pair 109 is connected through resistor 165 to the non-inverting input of gate 164. Also, resistor 166 is connected from VCC to the inverting terminal of gate 154 and resistor 167 is connected from VEE to the noninverting input of gate 164.

Also, the non-inverting input to gate 164 is connected through resistor 168 and capacitor 290 to VEE. The inverting input of gate 164 is connected through resistor 169 to capacitor 158. The bias input of gate 164 is connected through capacitor 290 to VEE. The non-inverting output of gate 164 is supplied on line 170 to the non-inverting input of gate 171. The bias terminal and inverting inputs of gate 171 are connected together. Also, line 170 is connected through resistor 172 and integrating capacitor 173 to VEE. Gate 171 thus drives its non-inverting output high when a signal is transmitted from connector 101.

The non-inverting outputs of gates 160 and 171 are coupled to line 174. The inverting outputs of gates 160 and 171 are connected to line 175. Line 175 is connected to an LED circuit, not shown, used to indicate when collision is detected.

Line 174 is connected to the inverting input of driver 176. The non-inverting input and bias terminals of gate 176 are connected together. The output of gate 176 is connected to collision signal line 150. A pull down resistor 182 is connected from line 174 to VEE.

An oscillator 177 is connected as well to line 174. The oscillator consists of gate 178 having its inverting output coupled through resistor 179 to its non-inverting input. The bias and inverting inputs of gates 178 are connected together. The non-inverting output of gate 178 is coupled through capacitor 180 back to the non-inverting input. Also, the non-inverting output is connected through resistor 181 to VEE. This oscillator supplies a 10 megaHertz square wave on line 174 when both gates 160 and 171 drive line 174 high. Otherwise, line 174 remains low and no signal is supplied through gate 176 to the collision line 150.

Figure 6:
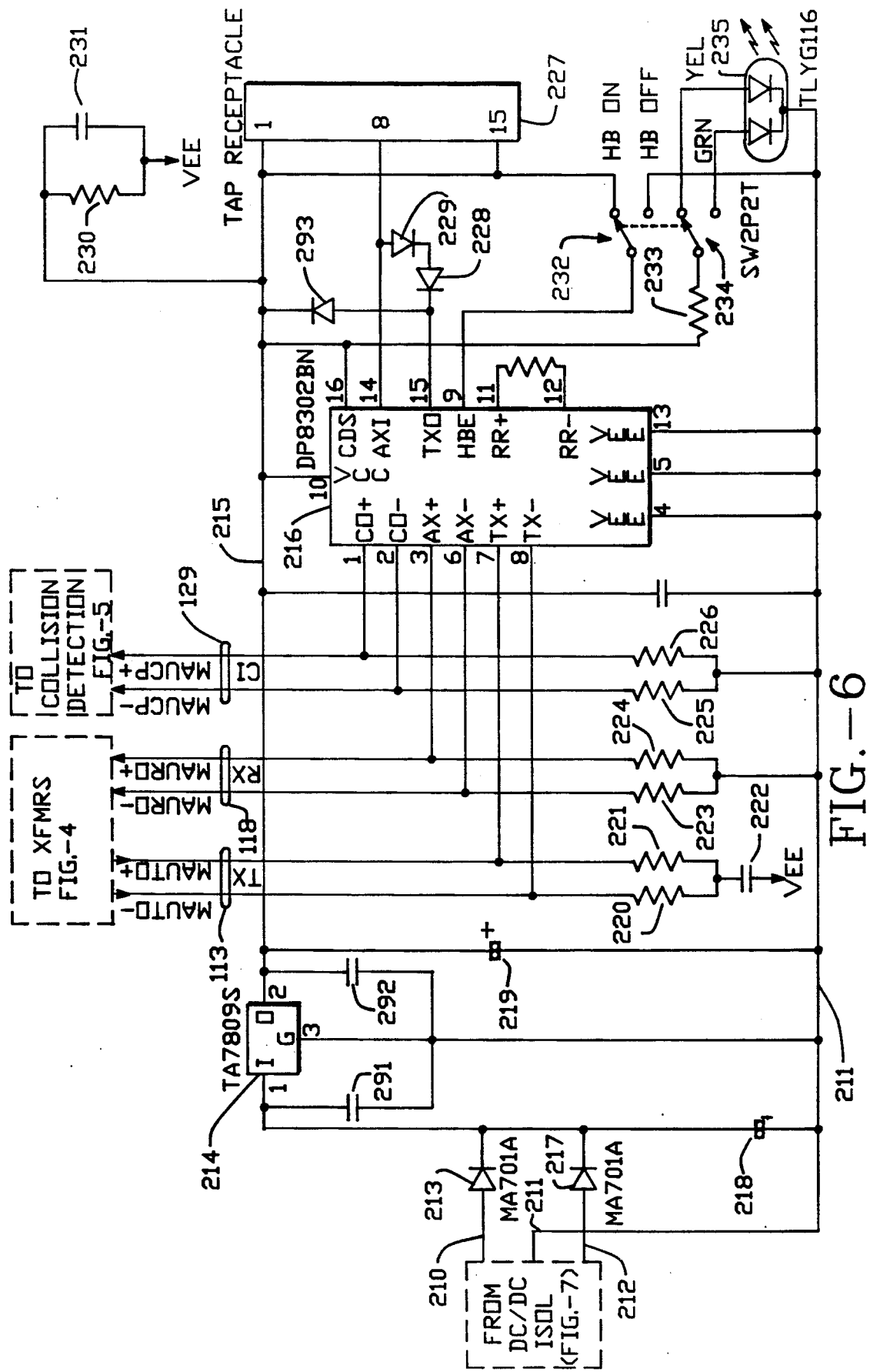

The collision pair 129 from the CTI circuit in FIG. 6 is coupled through capacitors 183 and 184 to the inverting and non-inverting inputs of gate 185. The bias terminal of gate 185 is connected through resistors 186 and 187 to the collision pair. The output of gate 185 is coupled to line 150 to provide a wired-OR function of the internal and external collision signals.

Thus, an internal collision signal from gate 176 or an external collision signal from the pair 129 will be coupled across line 150 to the non-inverting input of gate 188. Also, pull down resistor 189 is connected to line 150. The bias terminal and inverting input terminal of gate 188 are connected together. The inverting output of gate 188 is connected through capacitor 190 to the inverting input of gate 191. Similarly, the non-inverting output of gate 188 is connected through capacitor 192 to the non-inverting input of gate 191. Each of the outputs is coupled through pull down resistors 193 and 194 to VEE. Also, the bias input of gate 191 is connected through resistors 195 and 196 to the input lines of the gate 191. The inverting output of gate 191 is connected through diode 197 as a first input to input winding 198 of the collision signal transformer 199. The noninverting output of gate 191 is connected through diode 200 as a second input to the winding 198. These lines are also pulled down by resistors 201 and 202 connected to VEE.

The transformer 199 includes output windings 203 and 204 which are connected to the collision pairs 105 and 106 provided to the collision output lines of FIG. 4.

FIG. 6 illustrates connection of the coaxial transceiver interface circuit. It receives power from the DC/DC isolation circuit shown in FIG. 7 on lines 210, 211 and 212. It receives the transmit pair 113 from the circuit in FIG. 4 and supplies the receive pair 118 to the circuit of FIG. 4. Also it supplies the external collision signal on pair 129 to the circuit of FIG. 5.

The power on line 210 is connected through capacitor 213 to voltage regulator 214. The output of the voltage regulator is supplied on line 215 to the VCC input of the integrated circuit cable transceiver interface chip 216.

The power signal on line 212 is also connected through diode 217 as an input to the voltage regulator 214. The input of voltage regulator 214 is coupled through an electrolytic capacitor 218 to the line 211. Similarly, the output of the voltage regulator 214 is connected through electrolytic capacitor 219 to line 211. Line 211 is coupled to the VEE inputs of the CTI chip 216. Capacitor 291 is connected from the input to a ground terminal of the voltage regulator 214 and to line 211. Capacitor 292 is connected from the output to the ground terminal of the voltage regulator 214 and to VEE.

The CTI chip generates an external collision signal on lines 129, supplies the receive data pair on lines 118 and receives the transmit data pair on lines 113. The transmit data pair is connected through resistors 220 and 221 and capacitor 222 to the VEE terminal. The receive pair on lines 118 is coupled to resistors 223 and 224 to line 211. Similarly, the collision pair 129 is connected through resistors 225 and 226 to line 211.

The read data input RXI of the CTI chip 216 is connected to core connector of the tap receptacle 227. The transmit data output TXO is connected through diodes 228 and 229 to the core connector of the tap receptacle 227 and through diode 293 to line 215. Also, the tap receptacle 227 ground is connected to line 215. Line 215 is connected through resistor 230 and capacitor 231 to VEE.

The HBE output of the CTI chip 216 is connected to the enable/disable switch 232. Also, the CDS terminal of the chip 216 is connected through resistor 233 to switch 234 to select either green or yellow LED outputs at LED 235. Also, the CDS terminal of chip 216 is connected to line 215.

FIG. 7 is a diagram of the DC to DC isolation circuit. It receives the signal on line 128 from the circuit in FIG. 4. The signal on line 128 is supplied through inductor 250 to the center tap coil 251. Also, line 128 is connected through capacitor 252 to the VEE terminal. The VEE terminal is connected through inductor 253 to the emitter coupled junction of transistors 254 and 255. Capacitor 257 is connected across an output side of inductors 250 and 253. Also, resistors 258 and 259 are connected in series across the outputs of inductors 250 and 253. The collector of transistor 254 is connected to the first side of coil 256. The collector of transistor 255 is connected to the second side of coil 256. An electrolytic capacitor 260 is connected from the output of inductor 250 to a terminal between resistors 258 and 259. Also, this terminal is connected to the center tap of transformer 272. The base of transistor 254 is connected through resistor 261 to first side of winding 262 and the base of transistor 265 is connected through resistor 263 to the second side of winding 252. The positive side of output winding of 264 of transformer 251 is connected as line 210 to the circuit of FIG. 6. The negative end of winding 264 and the positive end of the winding 265 of transformer 272 are coupled together and to supply the line 211 to the circuit of FIG. 6. The negative side of winding 265 is connected as line 212 to the circuit of FIG. 6.

As can be seen, the present invention provides a simple and efficient system for coupling a plurality of ports to a single transceiver circuit for a local area network transmission medium, such as Ethernet local area networks.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for coupling signals between a data transmission medium and a plurality of data terminals, comprising:

a plurality of terminal interface means, each for connection to a respective data terminal, for connecting data and control signals to and from the respective data terminals;

means, connected to the plurality of terminal interface means, for detecting collisions between data signals transmitted from the plurality of terminal interface means and generating an internal collision signal in response to detected collisions;

a transmit signal isolating means, having a plurality of inputs each connected to receive data transmitted from a respective one of the plurality of terminal interface means, and having an output, for coupling data on any of the plurality of inputs to the output;

a collision signal isolating means, having a first input connected to receive the internal collision signal and a second input connected to receive an external collision signal, and having a plurality of outputs each connected to a respective one of the plurality of terminal interface means, for coupling the internal collision signal or the external collision signal to the plurality of outputs whereby each of the terminal interface means receives said collision signals;

a medium interface, coupled to the transmission medium, to the output of the transmit signal isolating means, and to the second input of the collision signal isolating means, including means for connecting transmitted data from the output of the transmit signal isolating means to the transmission medium, means for detecting collisions between data transmitted on the transmission medium and transmitted data from the output of the transmit signal isolating means, and means for generating the external collision signal in response to detected collisions.

2. The apparatus of claim 1, wherein the transmit signal isolating means comprises:

a transformer, having a plurality of first windings connected to respective ones of the plurality of terminal interface means, and having a second winding connected to the medium interface, for coupling data transmitted on any of the plurality of first windings to the second winding.

3. The apparatus of claim 1, wherein the collision signal isolating means comprises:

a transformer, having a first winding connected to receive the internal collision signal and the external collision signal, and having a plurality of second windings connected to respective ones of the plurality of terminal interface means, for coupling the internal collision signal or the external collision signal on the first winding to the plurality of second windings.

4. The apparatus of claim 1, wherein the collision signal isolating means comprises:

a transformer, having a first winding connected to receive the internal collision signal and a second winding connected to receive the external collision signal, and having a plurality of third windings connected to respective ones of the plurality of terminal interface means, for coupling the internal collision signal or the external collision signal on the first or second windings to the plurality of third windings.

5. The apparatus of claim 1, wherein the medium interface further includes means for receiving data from the transmission medium and supplying received data to a receive data line, and further including;

a receive signal isolating means, having an input connected to the receive data line, and having a plurality of outputs each connected to a respective one of the plurality of terminal interface means, for coupling data received on the input to the plurality of outputs.

6. The apparatus of claim 5, wherein the receive signal isolating means comprises:

a transformer, having a first winding connected to the receive data line, and having a plurality of second windings each connected to a respective one of the plurality of terminal interface means, for coupling data received on the first winding to the plurality of second windings.

7. The apparatus of claim wherein in the transmission medium comprises a CSMA/CD medium.

8. An apparatus for coupling signals between a CMSA/CD transmission medium and a plurality of data terminals, comprising:

a plurality of terminal interface means, each for connection to a respective data terminal, for connecting data and control signals to and from the respective data terminals;

means, connected to the plurality of terminal interface means, for detecting collisions between data signals transmitted from the plurality of terminal interface means and generating an internal collision signal in response to detected collisions;

a transmit signal isolating means, having a plurality of inputs each connected to receive data transmitted from a respective one of the plurality of terminal interface means, and having an output, for coupling data on any of the plurality of inputs to the output;

a receive signal isolating means, having an input connected to a receive data line, and having a plurality of outputs each connected to a respective one of the plurality of terminal interface means, for coupling data received on the input to the plurality of outputs;

a collision signal isolating means, having a first input connected to receive the internal collision signal and a second input connected to receive an external collision signal, and having a plurality of outputs each connected to a respective one of the plurality of terminal interface means, for coupling the internal collision signal or the external collision signal to the plurality of outputs whereby each of the terminal interface means receives said collision signals;

a medium interface, coupled to the transmission medium, to the receive data line, to the output of the transmit signal isolating means, and to the second input of the collision signal isolating means, including means for receiving data from the transmission medium and supplying received data to the receive data line, means for connecting transmitted data from the output of the transmit signal isolating means to the transmission medium, means for detecting collisions between data transmitted on the transmission medium and transmitted data from the means for generating the external collision signal in response to detected collisions.

9. The apparatus of claim 8, wherein the transmit signal isolating means comprises:
- a transformer, having a plurality of first windings connected to respective ones of the plurality of terminal interface means, and having a second winding connected to the medium interface, for coupling data transmitted on any of the plurality of first windings to the second winding.

10. The apparatus of claim 8, wherein the collision signal isolating means comprises:
- a transformer, having a first winding connected to receive the internal collision signal and the external collision signal, and having a plurality of second windings connected to respective ones of the plurality of terminal interface means, for coupling the internal collision signal or the external collision signal on the first winding to the plurality of second windings.

11. The apparatus of claim 8, wherein the collision signal isolating means comprises:
- a transformer, having a first winding connected to receive the internal collision signal and a second winding connected to receive the external collision signal, and having a plurality of third windings connected to respective ones of the plurality of terminal interface means, for coupling the internal collision signal or the external collision signal on the first or second windings to the plurality of third windings.

12. The apparatus of claim 8, wherein the receive signal isolating means comprises:
- a transformer, having a first winding connected to the receive data line, and having a plurality of second windings each connected to a respective one of the plurality of terminal interface means, for coupling data received on the first winding to the plurality of second windings.

13. An apparatus for coupling signals between a CMSA/CD transmission medium and a plurality of data terminals, comprising:
- a plurality of terminal interface means, each for connection to a respective data terminal, for connecting data and control signals to and from the respective data terminals;
- means, connected to the plurality of terminal interface means, for detecting collisions between data signals transmitted from the plurality of terminal interface means and generating an internal collision signal in response to detected collisions;
- a transmit signal transformer, having a plurality of first windings each connected to receive data transmitted from a respective one of the plurality of terminal interface means, and having a second winding, for coupling data on any of the plurality of first windings to the second winding;
- a receive signal transformer, having a first winding, and having a plurality of second windings each connected to a respective one of the plurality of terminal interface means, for coupling data received on the first winding to the plurality of second windings;
- a collision signal transformer, having at least one first winding connected to receive the internal collision signal and an external collision signal, and having a plurality of second windings each connected to a respective one of the plurality of terminal interface means, for coupling the internal collision signal or the external collision signal to the plurality of second windings whereby each of the terminal interface means receives both said collision signals;
- a medium interface, coupled to the transmission medium, to the first winding of the receive signal transformer, to the second winding of the transit signal transformer, and to the first winding of the collision signal transformer, including means for receiving data from the transmission medium and supplying received data to the first winding of the receive signal transformer, means for connecting transmitted data from the second winding of the transmit signal transformer to the transmission medium, means for detecting collisions between data transmitted on the transmission medium and transmitted data from the second winding of the transmit signal transformer and means for generating the external collision signal in response to detected collisions.

14. The apparatus of claim 13, wherein the collision signal transformer includes a first winding connected to receive the internal collision signal and a second winding connected to receive the external collision signal.

15. An apparatus for coupling signals between a data transmission medium and a plurality of data terminals comprising:
- a plurality of data terminal interface means, each connecting data signals and control signals to and from a respective data terminal and each including, data means for receiving transmitted data signals from the respective data terminal, and
- collision transmission means for transmitting a collision control signal to the respective data terminal,
- collision detection means for said plurality of data terminal interface means including,
  - internal collision detecting means for generating an internal collision signal when transmitted data signals from more than one of the data terminals are concurrently received by more than one of said data terminal interface means,
  - external collision detection means for detecting an external collision signal from the data transmission medium, and
  - means responsive to said internal collision detection means and to said external collision detection means for generating said congestion control signal for concurrent transmission said collision transmission means for each of said data terminal interface means to each of the respective data terminals, whenever said internal collision signal or said external collision signal is present.

* * * * *